(12) United States Patent
Davis, Jr. et al.

(10) Patent No.: US 6,921,128 B2
(45) Date of Patent: Jul. 26, 2005

(54) UNIVERSAL ENERGY ABSORBING BRACKET

(75) Inventors: Joseph J. Davis, Jr., Ortonville, MI (US); Sarkis B. Mikhjian, Rochester Hills, MI (US); John H. Faarup, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/430,556

(22) Filed: May 6, 2003

(65) Prior Publication Data

US 2004/0222669 A1 Nov. 11, 2004

(51) Int. Cl.[7] .......................... B62D 25/14; B60K 35/00; B60R 21/02
(52) U.S. Cl. .............................. 296/193.02; 296/187.05
(58) Field of Search ...................... 296/193.02, 187.03, 296/187.05, 187.09, 70, 29; 180/90; 280/748, 752

(56) References Cited

U.S. PATENT DOCUMENTS

| | | | |
|---|---|---|---|
| 5,238,286 A | * | 8/1993 | Tanaka et al. ............... 296/70 |
| 5,273,314 A | * | 12/1993 | Sakakibara ................. 280/752 |
| 5,456,494 A | * | 10/1995 | Witkovsky .................. 280/752 |
| 5,516,145 A | | 5/1996 | Williams et al. |
| 5,577,770 A | | 11/1996 | Sinner et al. |
| 5,664,801 A | | 9/1997 | Gray et al. |
| 5,775,723 A | | 7/1998 | Dede et al. |
| 5,934,733 A | | 8/1999 | Manwaring |
| 6,131,950 A | * | 10/2000 | Schroter .................... 280/753 |
| 6,196,588 B1 | * | 3/2001 | Sugawara ................... 280/779 |
| 6,213,504 B1 | * | 4/2001 | Isano et al. ................. 280/748 |
| 6,296,277 B1 | | 10/2001 | Bittinger et al. |
| 6,299,208 B1 | * | 10/2001 | Kasahara et al. ........... 280/752 |
| 6,378,934 B1 | | 4/2002 | Palazzolo et al. |
| 2002/0038965 A1 | | 4/2002 | Palazzolo et al. |
| 2003/0173763 A1 | * | 9/2003 | Yamazaki et al. .......... 280/748 |

FOREIGN PATENT DOCUMENTS

| | | | | | |
|---|---|---|---|---|---|
| JP | 405213128 A | * | 8/1993 | | ................. 280/752 |
| JP | 405213129 A | * | 8/1993 | | ................. 280/752 |
| JP | 6-87391 | | 3/1994 | | |
| JP | 406080056 A | * | 3/1994 | | ................. 280/752 |
| JP | 406087391 A | * | 3/1994 | | ................. 280/752 |
| JP | 406234343 A | * | 8/1994 | | ................. 280/752 |
| WO | 03/045763 | | 6/2003 | | |

* cited by examiner

*Primary Examiner*—H. Gutman
(74) *Attorney, Agent, or Firm*—MacMillan, Sobanski & Todd, LLC

(57) ABSTRACT

A method and apparatus for mounting knee and glove box surface configurations on a support structure utilizing a universal energy-absorbing bracket capable of being mounted on cross-car beams of a number of different car lines for supporting the different knee and glove box surface configurations.

9 Claims, 3 Drawing Sheets

UNIVERSAL ENERGY ABSORBING BRACKET

FIELD OF THE INVENTION

The invention relates to motor vehicles and more particularly, to cross-car beams and support brackets for motor vehicles.

BACKGROUND OF THE INVENTION

A conventional motor vehicle has an engine compartment towards its forward end and a passenger compartment rearward of the engine compartment. A laterally extending partition, commonly referred to as a firewall, is disposed between the engine compartment and the passenger compartment. A plenum chamber extends laterally along an upper portion of the firewall. A forward end of the plenum chamber is typically welded to the top of the firewall. Opposing lateral ends of the plenum chamber are attached to hinge pillars, often referred to as cowl sides, disposed along opposing sides of the motor vehicle towards a forward end of the passenger compartment.

A typical motor vehicle has a flange, disposed towards a forward end of the plenum chamber, for supporting the vehicle windshield. Fenders attached to the cowl sides extend forward of the cowl sides. Passenger compartment doors are pivotally attached to extend rearwardly of the cowl sides. A hood is pivotally attached to the fenders and extends towards the forward end of the vehicle.

In conventional motor vehicles, a cross-car beam extends between the cowl sides. Opposing lateral ends of the cross-car beam are typically attached to the cowl sides. A conventional cross-car beam is a closed steel chamber that increases the structural integrity of the vehicle and provides resistance to any side impact sustained by the vehicle.

The cross-car beam provides support for various automobile components. Such components include a glove compartment, a radio and tape deck or CD player, various storage pockets, an ashtray, a cigarette lighter or power outlet, and a coin receptacle, for example.

A steering column support bracket extends longitudinally between the plenum chamber and the cross-car beam. The forward portion of the steering column support bracket is attached to the plenum chamber and the rearward portion of the steering column support bracket is attached to the cross-car beam.

Laterally spaced apart energy-absorbing (E.A.) brackets extend rearwardly of the cross-car beam and function to absorb energy and slow the occupants down and assist the seat belts in the event the motor vehicle sustains an impact.

A duct is disposed forwardly of the cross-car beam and provides heating and air conditioning to the passenger compartment. The duct typically is provided with a supply inlet and a plurality of laterally spaced outlets. The inlet is connected to the outlet of a heating, ventilating, and air conditioning (HVAC) case. The outlets are connected to registers through which treated air is discharged into interior of the vehicle. The registers are adjustable to allow passengers to control airflow from the duct.

A second duct may extend parallel to and towards the upper end of the air supply duct to supply air to the windshield and the windows of the passenger compartment door. The air may be supplied through upper and lateral ends of the demister duct to eliminate mist on the windshield and windows of the passenger compartment doors.

Conventional cross-car beams, E.A. brackets, and steering column support brackets are typically formed of steel. Steel is an expensive resource that is costly to fabricate. Moreover, it is relatively heavy. The ducts are formed from plastic which is considerably less expensive than steel and less costly to fabricate. However, plastic materials have traditionally lacked the structural integrity of steel.

Each of a number of models of the vehicles of a given manufacturer requires separate E.A. brackets to accommodate knee and glove box surfaces, for example. Each of the separate E.A. brackets requires separate tooling, separate part numbers, and separate FEA (finite element analysis) testing and design time.

The need in the industry is to produce a common cross-bar for several different vehicle links, and associate universal E.A. brackets adaptable or use on various car lines having different knee and glove box configurations.

It would be desirable to produce an E.A. bracket which can be affixed to a common cross-car beam to accommodate various lines of knee and glove box configurations.

SUMMARY OF THE INVENTION

Consistent and consonant with the present invention, an E.A. bracket which can be affixed to a common cross-car beam to accommodate various lines of knee and glove box configurations has surprisingly been discovered.

Accordingly, the present invention produces an economic, simple, and reliable mounting system and method of mounting for knee and glove box wherein the method includes the steps of preparing the passenger compartment of a vehicle with a cross-car beam having a longitudinal axis; providing at least one energy absorbing bracket for attachment to the cross-car beam wherein the bracket is provided with an elongate mounting slot for receiving the cross-car beam along the length of the slot and is provided with an outer peripheral configuration for receiving a knee and glove box surface configuration; mounting the energy absorbing bracket at a predetermined position on the cross-car beam generally normal to the longitudinal axis of the cross-car beam wherein the cross-car beam is received within the elongate slot of the energy absorbing bracket; and attaching the energy absorbing bracket adjacent the portion thereof defining the elongate slot to the cross-car beam.

BRIEF DESCRIPTION OF THE DRAWINGS

The above, as well as other advantages of the present invention, will become readily apparent to those skilled in the art from reading the following detailed description of an embodiment of the invention when considered in the light of the attached drawings, in which.

DESCRIPTION OF THE PREFERRED EMBODIMENT

Figure 1:
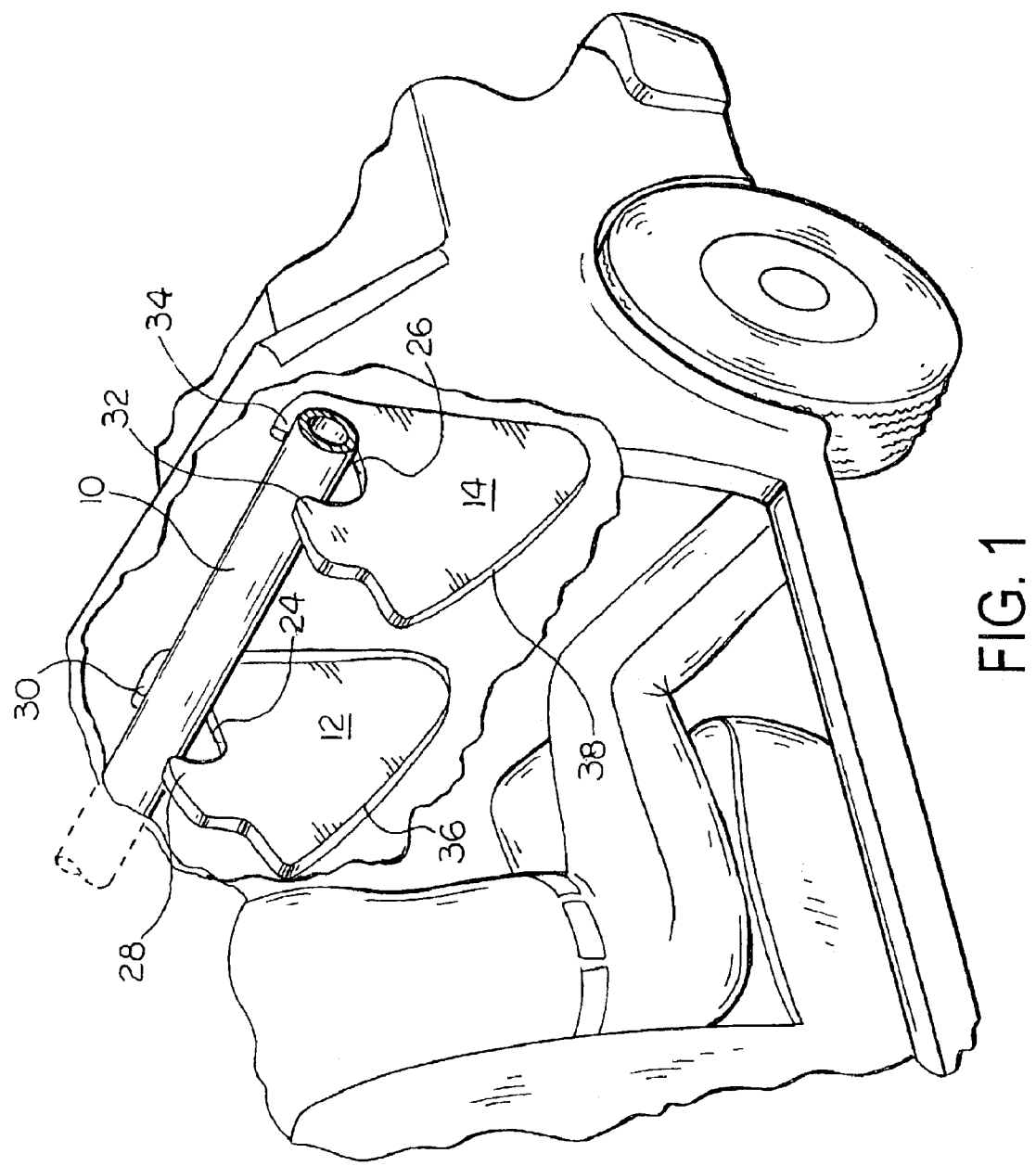
FIG. 1 is a fragmentary perspective view of the passenger side of a passenger compartment of a vehicle with portions broken away to show the disposition of a pair of spaced apart energy absorbing brackets mounted on a cross-car beam wherein the brackets are suitable for the mounting of knee and glove box surface configurations.
Figure 2:
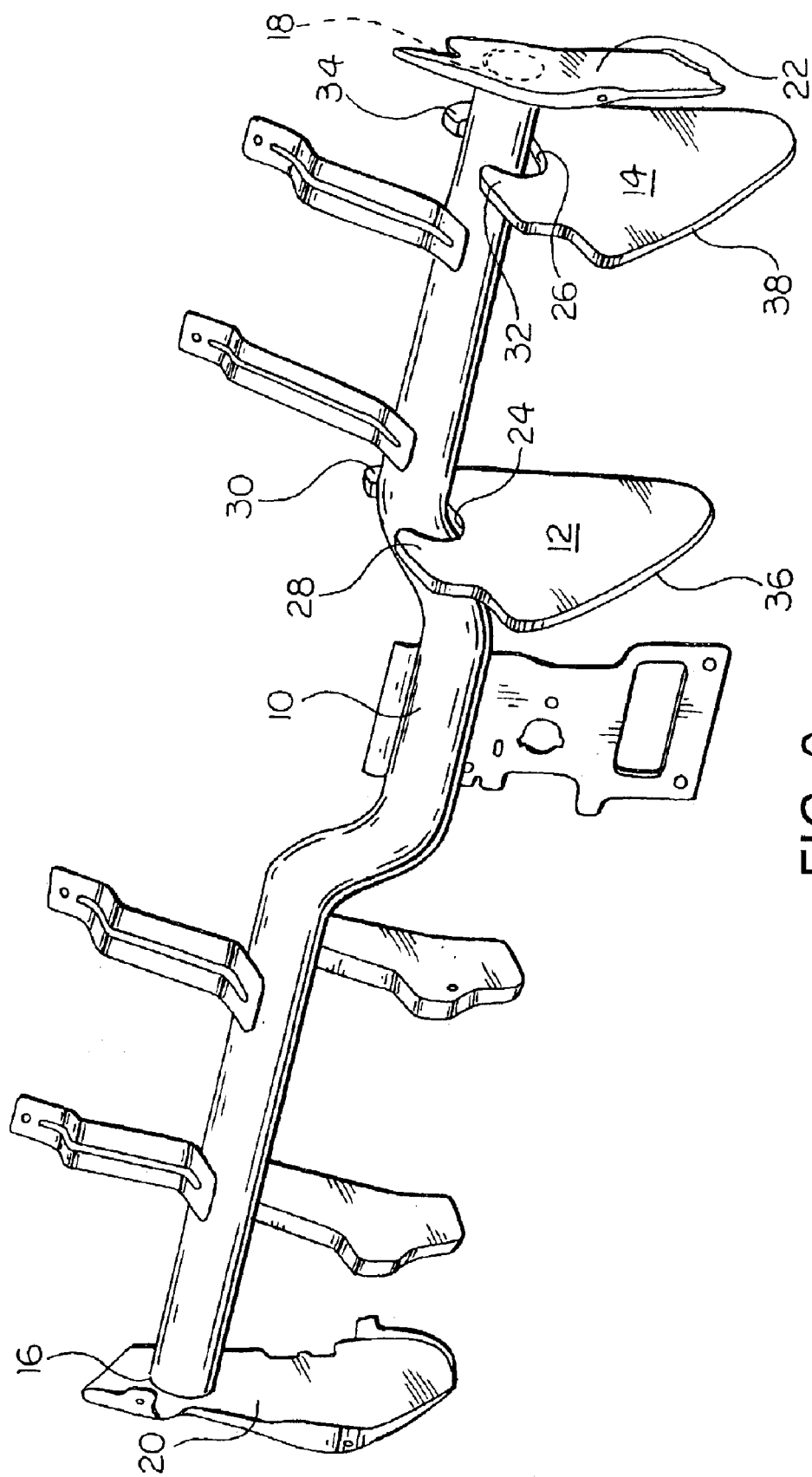
FIG. 2 is a fragmentary perspective view of the cross-car beam with the spaced apart energy absorbing brackets illustrated in FIG. 1.

Referring to the drawings, there is shown in FIG. 1 a fragmentary sectional view of a passenger compartment of a vehicle, and illustrating the relative position of a typical cross-car beam 10. A pair of spaced apart energy-absorbing brackets 12, 14 are mounted on or affixed to the beam 10, such as by welding, for example. The brackets 12, 14 are typically substantially identical with one another. FIG. 2 discloses in more detail the structure of the cross-car beam 10. The opposite ends 16, 18 of the elongate cross-car beam 10 are suitably affixed to respective areas of the vehicle cowl sides 20, 22.

It will be noted from an examination of the figures that the energy-absorbing brackets 12, 14 include a main body portion and are provided with elongate slots 24, 26, respectively. Access to the interior of the slots 24, 26 is achieved through openings defined by respective pairs of facing hanger portions 28, 30 and 32, 34. The elongate slots 24, 26, between the respective facing hanger portion 28, 30 and 32, 34 must be at least slightly larger than the outside diameter of the cross-car beam 10. In the preferred embodiment, the energy-absorbing brackets 12, 14 are stamped from steel stock. It is understood that other production methods could be used without departing from the scope and spirit of the invention. In addition to the formation of the elongate slots 24, 26, the energy-absorbing brackets 12, 14 are formed with corresponding contoured edge portions 36 and 38, respectively, adapted to receive knee or glove box surfaces.

Figure 3:
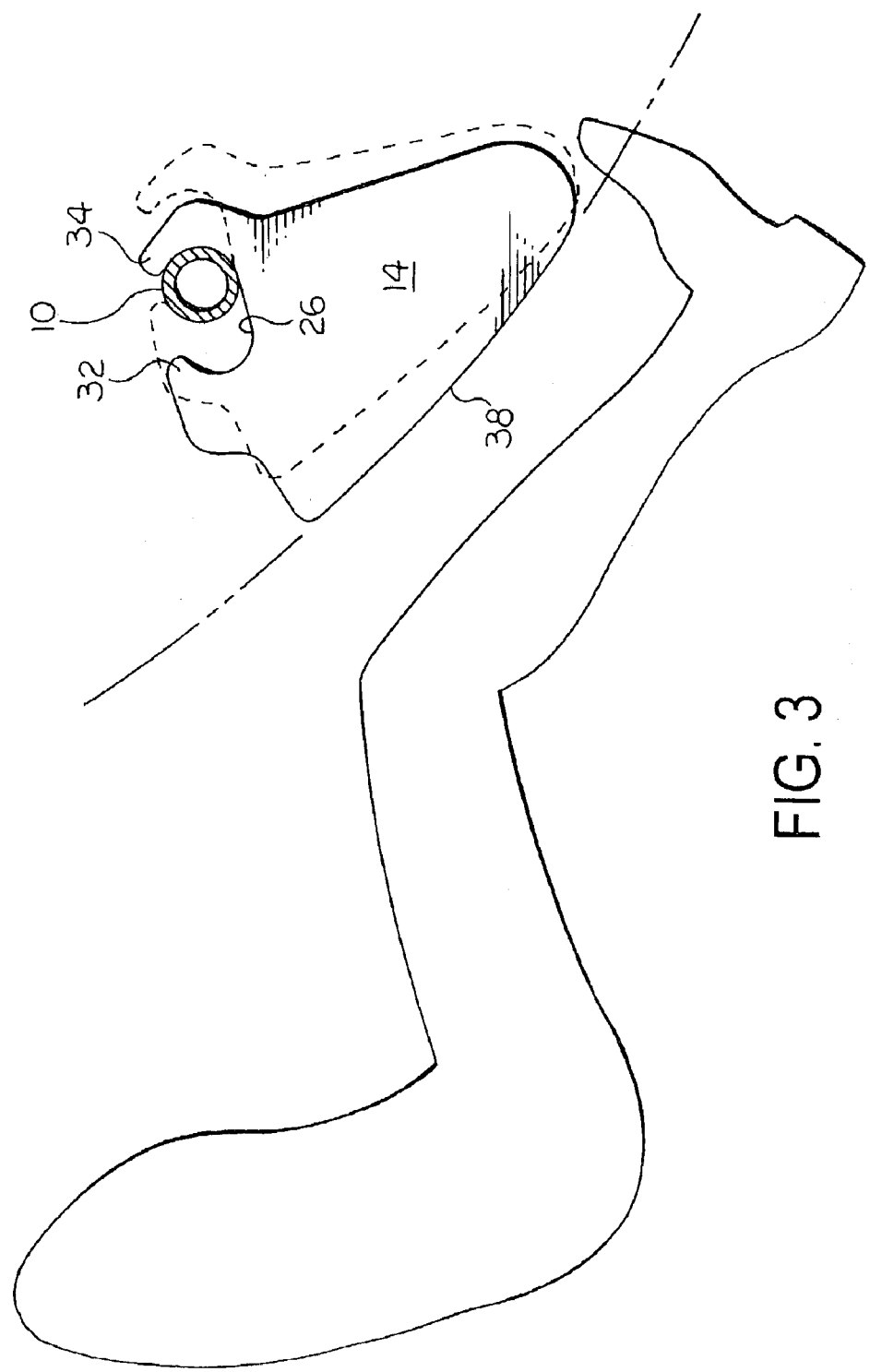
FIG. 3 is a fragmentary elevational view of one of the energy absorbing brackets illustrated in FIGS. 1 and 2 schematically illustrating possible different mounting locations of the bracket on the associated cross-car beam.

The energy-absorbing brackets 12, 14 are suitably affixed to the cross-car beam 10 in a predetermined relation to one another to satisfactorily receive the associated knee or glove box surfaces. Since such surfaces may differ between car lines, for example, the same energy-absorbing brackets 12, 14 may be used in a universal sense to accommodate different knee and glove box surface configurations by merely sliding and/or rotating the brackets 12, 14 in respect of the supporting cross-car beam 10, as illustrated by the phantom lines in FIG. 3.

The energy-absorbing brackets 12, 14 are typically affixed to the cross-car beam 10 by welding a portion of the inner surface of the slots 24, 26 to the adjacent surface of the outer surface of the beam 10.

In use, the energy-absorbing brackets 12, 14 can be positioned on the cross-car beam 10 as desired to receive different knee and glove box sizes and configurations. Additionally, the energy-absorbing brackets 12, 14 can be used at other locations on the cross-car beam 10 and adapted to accommodate other vehicle component structures such as a radio and tape deck or CD player, various storage pockets, an ashtray, a cigarette lighter or power outlet, and a coin receptacle, and steering column components, for example.

The present invention surprisingly has provided a system having a rather universal application to accommodate the design requirements of a number of different vehicle lines without the necessity of requiring separate stampings for each different car. For example, in a car application, the energy-absorbing brackets 12, 14 can be positioned as illustrated by the solid lines in FIG. 3. To use the energy-absorbing brackets 12, 14 in a sport utility vehicle or truck, the energy-absorbing brackets 12, 14 can be positioned as illustrated by the phantom lines in FIG. 3.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. An energy-absorbing bracket affixable to a cross-car beam for receiving and supporting vehicle component structures, the bracket comprising:

a main body portion having an extended surface defined by an outer peripheral edge contoured to receive knee and glove box surfaces; and a pair of outwardly extending facing hangers defining an elongate slotted portion shaped to receive and be affixed to the cross-car beam, wherein said facing hangers are spaced apart by a distance greater than the lateral width of the cross car beam such that said bracket is adapted to be affixed to said cross car beam at one of multiple lateral positions relative to said beam.

2. An energy-absorbing bracket as defined in claim 1 wherein the main body portion is formed from steel stock.

3. A cross-car beam for a vehicle comprising:

an elongate beam having a first end and a second end adapted to be affixed to a vehicle cowl side, said elongate beam having a cross-sectional lateral width;

at least one energy-absorbing bracket having a main body portion, the main body portion of said energy-absorbing bracket having an extended surface defined by an outer peripheral edge contoured to receive a vehicle component structure, the main body portion of said energy-absorbing bracket including a pair of outwardly extending facing hangers defining an elongate slotted portion adapted to receive and be affixed to said elongate beam, wherein said facing hangers are spaced apart by a distance greater than the lateral width of said elongate beam such that said bracket is adapted to be affixed to said elongate beam at one of multiple lateral positions relative to said elongate beam.

4. A cross-car beam as defined in claim 3 wherein said energy-absorbing bracket is formed from steel stock.

5. A cross-car beam as defined in claim 3 including at least two of said energy-absorbing brackets.

6. An energy-absorbing bracket as defined in claim 3, wherein said bracket is affixed to said elongate beam such that one of said facing hangers abuts said elongate beam and is attached thereto.

7. A method of mounting knee and glove box surface configurations on a support structure of a vehicle comprising the steps of:

preparing the passenger-compartment of a vehicle with a cross-car beam having a longitudinal axis and a lateral width;

providing at least one energy absorbing bracket for attachment to the cross-car beam wherein the bracket is provided with a pair of outwardly extending facing hangers defining an elongate mounting slot for receiving the cross-car beam and is provided with an outer peripheral edge for receiving a knee and glove box surface, wherein the facing hangers are spaced apart by a distance greater than the width of the cross car beam;

positioning the energy absorbing bracket at a predetermined position on the cross-car beam generally normal to the longitudinal axis of the cross-car beam wherein the cross-car beam is received within the elongate slot of the energy absorbing bracket such that the bracket is positioned in one of multiple lateral positions relative to the cross car beam; and attaching the energy-absorbing bracket adjacent the portion of the bracket defining the elongate slot to the cross-car beam.

8. The method according to claim 7, wherein the energy-absorbing bracket is attached to the cross-car beam by welding.

9. The method according to claim 7, wherein the energy-absorbing bracket is positioned against one of the facing hangers, and is attached to the one of the facing hangers.

* * * * *